(12) United States Patent
Sudo et al.

(10) Patent No.: US 6,620,467 B2
(45) Date of Patent: Sep. 16, 2003

(54) LIQUID CRYSTAL DISPLAY

(75) Inventors: Go Sudo, Saitama (JP); Shotaro Kawakami, Saitama (JP); Haruyoshi Takatsu, Tokyo (JP); Hiroyuki Ohnishi, Saitama (JP); Naoe Katoh, Tokyo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 88 days.

(21) Appl. No.: 09/911,810

(22) Filed: Jul. 25, 2001

(65) Prior Publication Data

US 2002/0033929 A1 Mar. 21, 2002

(30) Foreign Application Priority Data

Jul. 25, 2000 (JP) ......................................... 2000-223738

(51) Int. Cl.$^7$ .......................... C09K 19/34; C09K 19/30
(52) U.S. Cl. .............. 428/1.1; 252/299.61; 252/299.63; 349/179
(58) Field of Search ....................... 252/299.61, 299.63; 428/1.1; 349/179

(56) References Cited

U.S. PATENT DOCUMENTS 5,030,382 A 7/1991 Yamada ................. 252/299.61

FOREIGN PATENT DOCUMENTS

| EP | 0825176 A1 | 2/1998 |
| JP | 55-38869 | 3/1980 |
| JP | 03-038572 | 2/1991 |
| JP | 10-330754 | 12/1998 |
| JP | 11-106752 | 4/1999 |
| JP | 2000-336364 | 12/2000 |

OTHER PUBLICATIONS

Database Section CH, Week Sep. 26, 1999; Derwent Publications Ltd., London; XP002181709—Abstract.
B. Clinton, D. Prince; "Hardware Architectures for Video-Rate, Active Addressed STN Displays"; *Japan Display '92*; (Oct. 12–14, 1992) pp. 503–506.

*Primary Examiner*—Shean C. Wu
(74) *Attorney, Agent, or Firm*—Armstrong, Westerman & Hattori, LLP (57) ABSTRACT

A supertwisted nematic liquid crystal display having twist angle of 180 to 270° C. and comprising: a pair of substrates each having an orientation-controlling layer and a transparent electrodel; a liquid crystal layer comprising a liquid crystal composition, which is sandwiched by the substrates; and at least one polarizing sheet provided on at least one of the substrates, wherein the liquid crystal composition comprises: at least one compound represented by formula (I):

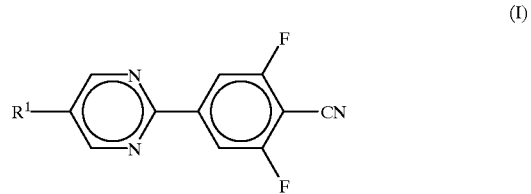

and at least one compound represented by formula (II):

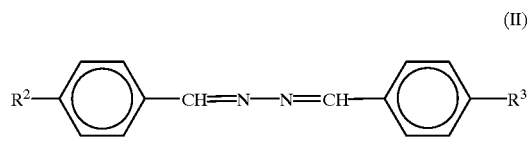

and wherein said liquid crystal composition has a nematic-isotropic phase transition temperature of 75 to 150° C. and a refractive index anisotropy ($\Delta n$) of 0.07 to 0.25. The symbols in formulae (I) and (II) are defined in the specification.

10 Claims, 1 Drawing Sheet

Fig.1

LIQUID CRYSTAL DISPLAY

FIELD OF THE INVENTION

This invention relates to a liquid crystal display, particularly, having improved temperature dependence of threshold voltage, stably high contrast in a broader temperature range and an improved switching time at room temperature and low temperature ranges.

BACKGROUND OF THE INVENTION

Not being limited to indoor use, liquid crystal displays (LCDs) have been extending their outdoor use under severe temperature conditions, such as in personal digital assistances (PDAs) for computers, automotive instruments, and other instruments for outdoor use. With this broadening of application, reduction in display contrast of LCDs due to surrounding temperature change has given rise to a problem. The reduction in LCD display quality with surrounding temperature change is largely attributed to the temperature dependence of the threshold voltage $V_{th}$. Conceivable causes of the $V_{th}$ change with temperature include changes of elastic coefficients dielectric constant, etc. of nematic liquid crystals with temperature and changes of intrinsic pitch of a chiral dopant added with temperature. It has been proposed to improve temperature dependence of a threshold voltage by controlling change with temperature in intrinsic pitch of a chiral dopant (see JP-A-55-38869). However, this technique is disadvantageous in that the effect varies depending on the combination of mother liquid crystals and a chiral dopant used in the constituting liquid crystal composition and that an increase of the chiral dopant adversely affects the display characteristics such as a response.

Further, because the current increases with temperature change-induced change in mobility of the ionic substance contained in liquid crystals, the effective voltage applied to the liquid crystals is consumed by ions, resulting in a reduction of the contrast Therefore, current control is an important factor for contrast improvement.

To improve response characteristics in supertwisted nematic (STN) LCDs, an active addressing drive system has recently been proposed (Proc. 12th International Display Research conference, p. 503 (1992) It has been required for PDAs to have satisfactory display characteristics in a broader temperature range. Liquid crystal materials to be used in these applications are required to have a low viscosity and capability of being driven at a low driving voltage and yet keeping a constant voltage over a broad temperature range. Improvements in these respects are proposed in JP-A-3-38572, U.S. Pat. No. 5,030,382, JP-A-12-336364, JP-A-10-330754, and JP-A-11-106752. The proposed techniques, however, cannot be seen as satisfactory in terms of switching time and contrast at a desired threshold voltage or in a desired time-sharing system. Proposals on novel liquid crystal displays are still awaited.

SUMMARY OF THE INVENTION

An object of the present invention is to provide a liquid crystal display which alleviates the disadvantages associated with the state-of-the-art liquid crystal displays, i.e., which exhibits reduced temperature dependence of driving voltage, a high contrast (steepness) and a short switching time.

Specifically, the object is to achieve improvement on temperature dependence of threshold voltage without impairing various characteristics of liquid crystals when driven at a desired threshold voltage or a desired duty (time-sharing drive), thereby securing a high contract stably in a broader temperature range and reducing a switching time at room temperature and low temperature ranges.

Another object of the invention is to provide an LCD (STN-LCD) having excellent characteristics, such as an increased display capacity and capability of displaying a colored motion picture, that are requested of, for example, cellular phones of next generation, which is driven at, e.g., 1/32 to 1/480 duty, preferably 1/64 to 1/240 duty.

Other objects and effects of the present invention will become apparent from the following description.

As a result of extensive researches into liquid crystal displays comprising various liquid crystal compositions, the present inventors found the following liquid crystal display:

A supertwisted nematic liquid crystal display having a twist angle of 180 to 270° C. and comprising:

a pair of substrates each having an orientation-controlling layer and a transparent electrode;

a liquid crystal layer comprising a liquid crystal composition, which is sandwiched by said substrates; and at least one polarizing sheet provided on at least one of said substrates, wherein said liquid crystal composition comprises:

at least one compound represented by formula (I):

(I)

wherein $R^1$ represents an alkyl group having 1 to 16 carbon atoms, an alkoxy group having 1 to 16 carbon atoms, an alkenyl group having 2 to 16 carbon atoms, an alkoxyalkyl group having 2 to 16 carbon atoms, or an alkenyloxy group having 3 to 16 carbon atoms; and at least one compound represented by formula (II):

(II)

wherein $R^2$ and $R^3$ each independently represent a fluorine-substituted or unsubstituted alkyl group having 1 to 16 carbon atoms, a fluorine-substituted or unsubstituted alkoxy group having 1 to 16 carbon atoms, or a fluorine-substituted or unsubstituted alkenyl group having 2 to 16 carbon atoms, and wherein said liquid crystal composition has a nematic-isotropic phase transition temperature of 75 to 150° C. and a refractive index anisotropy (Δn) of 0.07 to 0.25.

Liquid crystal displays using the compounds of formula (I), while effective in reducing a threshold voltage, are accompanied with a viscosity increase. On the other hand, liquid crystal displays using the compounds of formula (II) are low-viscosity compounds effective in shortening a switching time but have small polarity which increases the driving voltage. Under these circumstances, the inventors reached findings that a liquid crystal display using at least one of the compounds of formula (I) and at least one of the compounds of formula (II) in combination compensates for the respective drawbacks with each other and also bring about a surprising improvement on temperature dependence of threshold voltage, especially on switching time in low temperature.

DETAILED DESCRIPTION OF THE INVENTION

Figure 1:
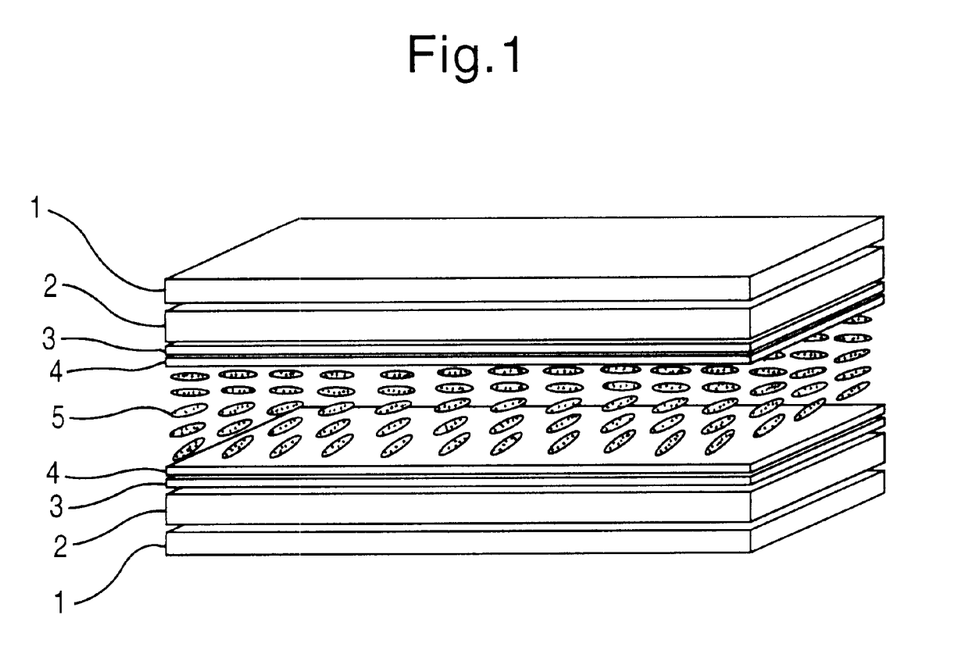
FIG. 1 shows an example of the structure of the electro-optical device according to the present invention.

A representative example of the structure of the liquid crystal display according to the present invention is shown in FIG. 1. In the figure, reference numeral 1 denotes a polarizing sheet; 2, a substrate; 3, a transparent electrode or a transparent electrode having an active element, 4, orientation layer; and 5, a liquid crystal.

The liquid crystal composition for use in the present invention comprises at least one compound of formula (I). It is preferred for the liquid crystal composition to comprise from one up to four kinds, particularly one or two kinds, of the compounds of formula (I) in formula (I), $R^1$ is preferably an alkyl group having 1 to 16 carbon atoms or an alkenyl group having 2 to 16 carbon atoms, still preferably an alkyl group having 1 to 8 carbon atoms or an alkenyl group having 2 to 8 carbon atoms, particularly preferably an alkyl group having 1 to 5 carbon atoms or an alkenyl group represented by formulae (a) to (e):

(a)

(b)

(c)

(d)

(e)

$R^1$ is especially preferably the alkenyl group (a) or (b).

The total content of the compounds of formula (I) in the liquid crystal composition is preferably 2 to 20% by weight, still preferably 2 to 10% by weight. Weight being put on contrast, the total content of the compounds of formula (I) is preferably 2 to 8% by weight. Weight being placed on a low driving voltage or a short switching time, it is preferably 8 to 20% by weight.

The liquid crystal composition for use in the present invention comprises at least one compound of formula (II). It is preferred for the liquid crystal composition to comprise at least one of the compounds represented by formula (II-a) through (II-h) shown below as at least one compound represented by formula (II). It is particularly preferred that the composition contain the compound (II-c) and/or the compound (II-d).

(II-a)

(II-b)

(II-c)

(II-d)

(II-e)

(II-f)

(II-g)

(II-h)

The total content of the compounds of formula (II) in the composition is preferably 5 to 30% by weight, still preferably 10 to 20% by weight. Where weight is attached to a switching time, the total content of the compounds of formula (II) is desirably at least 10% by weight.

The liquid crystal composition for use in the invention has a feature of having a nematic-isotropic phase transition temperature in a range of from 75° C. to 150° C. The nematic-isotropic phase transition temperature is preferably from 80° C. to 120° C., and particularly preferably from 85° C. to 110° C. Where a switching time is of particular interest, that phase transition temperature is preferably 75 to 95° C. Importance put on the temperature dependence of $V_{th}$ in high temperature, that phase transition temperature is preferably 95 to 120° C.

The STN-LCD according to the present invention made of the liquid crystal composition shows unexpected improvements on parameters (i) dV/dT (temperature dependence of $V_{th}$) and (ii) $\tau^{25°\ C.}$ (switching time at 25° C.), which are particularly meaningful for display characteristics.

That is, (i) dV/dT≦7 mV/° C. in a temperature range of −20° C. to 50° C.,
wherein

$$dV/dT=|(V_{th}(50°\ C.)-V_{th}(-20°\ C.)/(50°\ C.-(-20°\ C.))|.$$

STN-LCDs comprising liquid crystal compositions of background art have this parameter exceeding 10 and suffer considerable changes in display contrast with surrounding temperature changes.

The STN-LCD of the present invention comprising the liquid crystal composition was proved competent to achieve (ii) $\tau^{25°\ C.}$≦200 msec, thereby improving low-temperature display characteristics and high-temperature contrast and to exhibit excellent characteristics, such as an increased display capacity and capability of displaying colored motion pictures that are requested of, for example, cellular phones of next generation driven at 1/32 to 1/480 duty, preferably 1/64 to 1/240 duty.

The liquid crystal composition for use in the invention is also distinguished by having a refractive index anisotropy Δn of 0.07 to 0.25, preferably 0.08 to 0.20, still preferably 0.12 to 0.18. Weight being put on a switching time, Δn preferably ranges from 0.15 to 0.20.

It is preferred for the liquid crystal composition to further comprise at least one compound represented by formula (III):

(III)

wherein $R^4$ and $R^5$ each independently represent a fluorine-substituted or unsubstituted alkyl group having 1 to 16 carbon atoms, a fluorine-substituted or unsubstituted alkoxy group having 1 to 16 carbon atoms, a fluorine-substituted or unsubstituted alkenyl group having 2 to 16 carbon atoms, a fluorine-substituted or unsubstituted alkoxyalkyl group having 2 to 16 carbon atoms, or a fluorine-substituted or unsubstituted alkenyloxy group having 3 to 16 carbon atoms; ring A, ring B and ring C each independently represent a 1,4-phenylene group, a 2 or 3-fluoro-1,4-phenylene group, a 2,3-difluoro-1,4-phenylene group, a 3,5-difluoro-1,4-phenylene group, a 2,6-difluoro-1,4-phenylene group, a 2-methyl-1,4-phenylene group, a 3-methyl-1,4-phenylene group, a naphthalene-2,6-diyl group, a phenanthrene-2,7-diyl group, a fluorene-2,7-diyl group, a trans-1,4-cyclohexylene group, a 1,2,3,4-tetrahydronaphthalene-2,6-diyl group, a decahydronaphthalene-2,6-diyl group, a trans-1,3-dioxane-2,5-diyl group, a pyridine-2,5diyl group, a pyrimidine-2,5-diyl group, a pyrazine-2,5-diyl group or a pyridazine-2,5-diyl group, and may be each mono- or di-substituted with a group(s) selected from the group consisting of a fluorine atom, a chlorine atom and a methyl group; represents 0, 1 or 2; and $Z^1$ and $Z^2$ each independently represent a single bond, —CH₂CH₂—, —(CH₂)₄—, —OCH₂O—, —CH₂O—, —COO—, —OCO—, —CH=CH— or —C≡C—.

In formula (III), $R^4$ and $R^5$ each preferably represent an alkyl group having 1 to 16 carbon atoms or an alkenyl group having 2 to 16 carbon atoms, still preferably an alkyl group having 1 to 8 carbon atoms or an alkenyl group having 2 to 8 carbon atoms, particularly preferably an alkyl group having 1 to 5 carbon atoms or an alkenyl group represented by formulae (a) to (e):

(a)

(b)

(c)

(d)

(e)

Rings A, B and C each preferably represent a 1,4-phenylene group or a trans-1,4-cyclohexylene group. In particular, rings A and B each still preferably represent a trans-1,4-cyclohexylene group, and ring C still preferably represents a 1,4-phenylene group.

l preferably represents 0 or 1.

$Z^1$ and $Z^2$ each preferably represent a single bond or —CH$_2$CH$_2$—, with a single bond being particularly preferred.

For ensuring the improvement on a switching time, the compound(s) of formula (III) is/are preferably selected from the compounds represented by formula (III-a) through (III-o) (wherein $R^7$ and $R^8$ have the same meanings as $R^4$ and $R^5$) shown below. Three to 20 kinds, particularly 5 to 15 kinds of the Compounds (III) are preferably used in combination.

(III-a)

(III-b)

(III-c)

(III-d)

(III-e)

(III-f)

(III-g)

(III-h)

(III-i)

(III-j)

(III-k)

(III-l)

(III-m)

(III-n)

(III-o)

The total content of the compounds of formula (III) in the liquid crystal composition is preferably 5 to 85% by weight, still preferably 30 to 80% by weight, particularly preferably 40 to 70% by weight.

It is preferred for the liquid crystal composition to furthermore comprise at least one compound represented by formula (IV):

(IV)

wherein $R^6$ represents a fluorine-substituted or unsubstituted alkyl group having 1 to 16 carbon atoms, a fluorine-substituted or unsubstituted alkoxy group having 1 to 16 carbon atoms, a fluorine-substituted or unsubstituted alkenyl group having 2 to 16 carbon atoms, a fluorine-substituted or unsubstituted alkoxyalkyl group having 2 to 16 carbon atoms, or a fluorine-substituted or unsubstituted alkenyloxy group having 3 to 16 carbon atoms; m represents 0 or 1; $X^1$ represents a fluorine atom, a chlorine atom, a trifluoromethyl group, a trifluoromethoxy group or a cyano group; and $Y^1$ and $Y^2$ each represent a hydrogen atom or a fluorine atom.

In formula (IV), as preferably represents an alkyl group having 1 to 16 carbon atoms or an alkenyl group having 2 to 16 carbon atoms, particularly an alkyl group having 1 to 8 carbon atoms or an alkenyl group having 2 to 8 carbon atoms, especially an alkyl group having 1 to 5 carbon atoms or an alkenyl group represented by formulae (a) to (e):

(a)

(b)

(c)

(d)

(e)

The compound(s) of formula (IV) is/are preferably selected from the compounds represented by formula (IV-a) through (IV-o) (wherein $R^9$ has the same meaning as $R^6$) shown below. Three to 20 kinds, particularly 5 to 15 kinds of the compounds (IV) are preferably used in combination.

(IV-a)

(IV-b)

-continued

(IV-c)

(IV-d)

(IV-e)

(IV-f)

(IV-g)

(IV-h)

(IV-i)

(IV-j)

The total content of the compounds of formula (IV) in the composition is preferably 5 to 60% by weight, still preferably 5 to 50% by weight, particularly preferably 10 to 30% by weight.

In making a choice from among the compounds (III) and the compounds (IV), the following preference is suggested. Where reduction in viscosity of the composition is desired with importance attached to a switching time, it is preferred for the composition to contain at least one of compounds (III-a), (III-d), (III-e), (III-f), (III-i), (IV-b), and (IV-c).

Where an increased Δn is desired with weight placed on a switching time, it is desirable that at least one of compounds (III-i), (III-j), (III-k), (III-l), (III-m), (III-n), and (III-o) be incorporated. Where contrast carries weight, it is preferred that at least one of compounds (III-c), (III-e), (III-f), (IV-a), (IV-b) and (IV-c) be incorporated. Where further reduction of temperature dependence of threshold voltage is of particular interest, it is preferred to use at least one of compounds (IV-b), (IV-c), (IV-i), and (IV-j).

Liquid crystal displays using the liquid crystal composition comprising the compound (I), the compound (II) and an optimum combination of choice of the compound (III) and the compound (IV) achieve improvement on temperature dependence of threshold voltage without impairing various characteristics of liquid crystals when driven at a desired threshold voltage or at a desired duty in a time-sharing drive system, thereby securing a high contract (excellent steepness) stably in a broader temperature range and reducing a switching time at room temperature and low temperature.

The LCD comprising the above-described liquid crystal composition exhibits a current of 0.3 $\mu A/cm^2$ or lower after 16-hour UV irradiation in a sun test, proving highly excellent in UV resistance, and therefore furnishes displays of high reliability and high contrast.

In preferred embodiments of the present invention, the liquid crystal composition constituting the LCD of the present invention satisfies at least one of the following conditions with respect to parameters of (iii) dielectric anisotropy, (iv) elastic coefficient, and (v) viscosity (all the parameters are measured at 20° C.).

$$4 \leq \Delta\epsilon \leq 40 \qquad (iii)$$

$$1.1 \leq k33/k11 \leq 3.0 \qquad (iv)$$

$$10 \text{ mPa·s} \leq \text{viscosity} \leq 80 \text{ mPa·s} \qquad (v)$$

While the dielectric anisotropy Δ∈ can be 1 or greater, it is preferably in the range of 4 to 60. With the threshold voltage ranging 1.8 to 2.9 V, Δ∈ is preferably 4 to 10. With the threshold voltage being 1.5 to 1.9 V, Δ∈ is preferably 5 to 15. With the threshold voltage being 1.2 to 1.6 V, Δ∈ is preferably 12 to 30. For a threshold voltage of 0.8 to 1.3 V, Δ∈ is preferably 12 to 40. Importance being placed on a short switching time, a Δ∈ range of from 4 to 13 is preferred.

The elastic coefficient ratio k33/k11 is preferably 1.1 to 3.0, still preferably 1.2 to 2.8, particularly preferably 1.3 to 2.7.

The viscosity preferably ranges from 10 to 80 mPa·s, particularly 10 to 60 mPa·s, especially 10 to 40 mPa·s. When weight is attached to a short switching time, a range of from 10 to 20 mPa·s is particularly preferred.

Fulfillment of the conditions (iii), (iv) and (v) can be accomplished through proper selection of the compounds (I) to (IV). As a matter of course, it is a still preferred embodiment that two or more of the conditions (iii) to (v), especially their respective preferred ranges, be satisfied.

The twist angle of the STN-LCD according to the present invention is 180 to 270° C., preferably 220 to 270° C., still preferably 230 to 260° C.

The STN-LCD of the invention preferably satisfies at least one of the following conditions (i) and (ii):

$$dV/dT \leq 7 \text{ mV}/^\circ \text{ C. (temperature dependence of threshold voltage in a temperature range of } -20^\circ \text{ C. to } 50^\circ \text{ C.)} \qquad (i)$$

Compared with conventional STN-LCDs, the threshold voltage of the STN-LCD satisfying the condition (i) shows a temperature dependence of only 7 mV/° C. or even smaller in a temperature range of −20 to 50° C., which makes it possible to afford a high contrast display over a broad temperature range. The temperature dependence (dV/dT) of a threshold voltage (Vth) is still preferably 6 mV/° C. or less. The temperature dependence is preferably 5 mV/° C. or less in a lower side temperature range of −20° C. to 25° C. In a higher side temperature range of 25 to 50° C., the temperature dependence is preferably 9 mV/° C. or less.

$$\tau^{25^\circ \text{ C.}} \leq 200 \text{ msec (switching time at } 25^\circ \text{ C.)} \qquad (ii)$$

The switching time at 25° C., $\tau^{25^\circ \text{ C.}}$, is preferably 200 msec or shorter. The switching time at −20° C. is preferably 2000 msec or shorter, The STN-LCD of the invention exhibits very excellent steepness to provide a satisfactory contrast. The γ value (γ=$V_{th}/V_{sat}$; $V_{th}$: threshold voltage; $V_{sat}$: saturated voltage), a parameter for steepness, of the STN-LCD of the invention is 1.08 or smaller, preferably 1.06 or smaller, still preferably 1.05 or smaller. In a temperature range of from −20° to 50° C., the ratio of maximum γ to minimum γ can be 3% or lower, preferably 2% or lower.

It is particularly preferred for the STN-LCD of the invention to satisfy both the conditions (i) and (ii).

The liquid crystal composition constituting the LCD of the invention can contain known nematic liquid crystals, smectic liquid crystals, cholesteric liquid crystals, etc. in addition to the compounds of formulae (I) to (IV).

The above-described nematic liquid crystal composition is useful in TN-LCDs and STN-LCDs, especially STN-LCDs. For example, the composition is effective in improving display characteristics at 1/32 to 1/480 duty, particularly 1/64 to 1/240 duty, to provide an STN-LCD having excellent characteristics, such as an increased display capacity and capability of displaying colored motion pictures that are requested of cellular phones of next generation, etc. The LCD may be any of a transmission type, a semi-transmission type and a reflection type.

The present invention will now be illustrated in greater detail with reference to Examples, but it should be understood that the invention is not construed as being limited thereto. Unless otherwise noted, all the percents are given by weight.

The parameters measured in Examples are as follows.

| | |
|---|---|
| $T_{N-I}$: | Nematic-isotropic phase transition temperature (° C.) |
| $T \rightarrow_N$: | Solid or smectic-nematic phase transition temperature (° C.) |
| n: | Viscosity (mPa · s) at 20° C. |
| Δn: | Refractive index anisotropy |
| $V_{th}$: | Threshold voltage (V) of an STN-LCD having a cell thickness d (μm), the cell thickness d being decided by equation: Δn · d = 0.90 ($V_{th}$ is a driving voltage at a transmission of 90%) |
| $V_{sat}$: | Saturated voltage (V) of an STN-LCD having a cell thickness d (μm) ($V_{sat}$ is a driving voltage at a transmission of 10%) |
| $\gamma_{25^\circ \text{ C.}}$: | Steepness at 25° C. (γ = $V_{sat}/V_{th}$) |
| $\tau^{25^\circ \text{ C.}}$: | Switching time (msec) in an STN-LCD at 25° C. |
| $\tau^{-20^\circ \text{ C.}}$: | Switching time (msec) in an STN-LCD at −20° C. |
| Ir: | Current (μA/cm²) in an STN-LCD with an applied voltage of 2.5 V having a square wave form at 200 Hz after a sun test (UV irradiation for 16 hours at 25° C.) |
| $dV/dT^{a^\circ \text{ C.-}b^\circ \text{ C.}}$: | Temperature dependence of threshold voltage in a temperature range a° C. to b° C. |

$$dV/dT = |(V_{th}(a^\circ \text{ C.}) - V_{th}(b^\circ \text{ C.}))/(a^\circ \text{ C.}) - (b^\circ \text{ C.}))|$$

A display cell was made up of a pair of transparent electrode layers facing each other each having an orientation layer (formed by rubbing a film of a polyimide Sunever 150, available from Nissan Chemical Industries, Ltd.) disposed on the inner side thereof to make a twist angle of 240° C. A chiral dopant S-811 (available from Merck & Co., Inc.) was added to a nematic liquid crystal composition, and the mixture was filled into the cell to make an STN-LCD. The chiral dopant S-811 was added in such an amount that the doping-induced helical pitch P of the mixed liquid crystals and the cell thickness d might satisfy equations: $\Delta n \cdot d = 0.90$, $d/P = 0.50$.

In representing compounds used in Examples, the following abbreviations are used.

| Terminal -n (figure): | $-C_nH_{2n+1}$ |
| --- | --- |
| ndm-: | $C_nH_{2n+1}-CH=CH-(CH_2)_{m-1}-$ |
| -ndm: | $-(C_nH_{2n+1}-CH=CH-(CH_2)_{m-1})$ |
| -On: | $-OC_nH_{2n+1}$ |
| -T-: | $-C\equiv C-$ |
| -Z-: | $-CH=N-N=CH-$ |
| -VO-: | $-COO-$ |
| -CN: | $-C\equiv N$ |
| -F: | $-F$ |

Cy

Ph

Ph3

Ma

Examples of representation using these abbreviations are shown below.

5-Ma-Ph3-CN

3-Cy-Ph-CN

4-Ph-T-Ph-O2

0d1-Cy-Cy-5

3-Cy-Ph-O2

1d1-Cy-Ph-CN

0d3-Cy-Ph-CN

0d1-Cy-Cy-Ph-1

0d3-Cy-Cy-Ph-1

0d3-Ph-Z-Ph-(0d3)

EXAMPLES 1 AND 2 AND COMPARATIVE EXAMPLE 1

Nematic liquid crystal compositions shown in Table 1 below (Nos. 1 and 2) were prepared. Using these compositions, liquid crystal displays were produced with the above-described construction and their characteristics mere measured. The results obtained are shown in Table 1 together with those of Comparative Example 1.

TABLE 1

| | Example 1 (No. 1) | Example 2 (No. 2) | Compara. Example 1 | Ref. Example |
| --- | --- | --- | --- | --- |
| Composition (%): | | | | |
| 5-Ma-Ph3-CN | 3 | 5 | 0 | 0 |
| 0d3-Ph-Z-Ph-(0d3) | 15 | 15 | 15 | 0 |
| 3-Cy-Ph-CN | 2 | 0 | 5 | 0 |
| 1dl-Cy-Ph-CN | 15 | 15 | 15 | 18.75 (15) |
| 0d3-Cy-Ph-CN | 10 | 10 | 10 | 12.5 (10) |
| 4-Ph-T-Ph-O2 | 5 | 5 | 5 | 6.25 (5) |
| 0dl-Cy-Cy-5 | 20 | 20 | 20 | 25 (20) |
| 3-Cy-Ph-O2 | 3 | 3 | 3 | 3.75 (3) |
| 0dl-Cy-Cy-Ph-1 | 13 | 13 | 13 | 16.25 (13) |
| 0d3-Cy-Cy-Ph-1 | 14 | 14 | 14 | 17.5 (14) |

TABLE 1-continued

|  | Example 1 (No. 1) | Example 2 (No. 2) | Compara. Example 1 | Ref. Example |
| --- | --- | --- | --- | --- |
| Characteristics: | | | | |
| $T_{N-I}$ (° C.) | 90 | 89 | 91 | 86 |
| $T \rightarrow_N$ (° C.) | −52 | −50 | −50 | −51 |
| $V_{th}$ (V) | 2.23 | 2.15 | 2.36 | 2.53 |
| $\Delta n$ | 0.145 | 0.146 | 0.1423 | 0.11 |
| $dV/dT^{-20° C.-50° C.}$ (mV/° C.) | 5.9 | 3.1 | 7.3 | 7.5 |
| $dV/dT^{-20° C.--25° C.}$ (mV/° C.) | 4.0 | 1.5 | 6.0 | 5.8 |
| $dV/dT^{25° C.-50° C.}$ (mV/° C.) | 8.1 | 5.7 | 9.5 | 8.9 |
| $\tau^{25° C.}$ (msec) | 102 | 161 | 220 | 340 |
| $\tau^{-20° C.}$ (msec) | 1421 | 1119 | 2105 | 4733 |

Table 1 shows comparisons of characteristics obtained by adding, to mother components (80%) of the Reference Example, 5-Ma-Ph3-CN (compound of formula (I)), Od3-Ph-Z-Ph-(Od3) (compound of formula (II)) and 3-Cy-Ph-CN in various combinations. It can be seen that replacement of a part or the whole of 3-Cy-Ph-CN used in Comparative Example 1 with 5-Ma-Ph3-CN improved temperature dependence of the threshold voltage in both the low temperature range of from −20° C. to 25° C. and the high temperature range of from 25° C. to 50° C. in the Examples according to the invention using liquid crystal compositions containing the mother components, 5-Ma-Ph3-CN, Od3-Ph-Z-Ph-(Od3) and 3Cy-Ph-CN, as compared to Comparative Example 1 using a liquid crystal composition comprising mother components, Od3-Ph-Z-Ph-(Od3) and 3-Cy-Ph-CN. The replacement also brings about a great reduction in switching time τ at 25° C. from 220 msec to 182 msec or 161 msec. The measurement was made at a 1/64 duty. The current Ir in Examples 1 and 2 was 0.25 µA/cm².

EXAMPLES 3 AND 4

Nematic liquid crystal compositions shown in Table 2 below (Nos. 3 and 4) were prepared. Using these compositions, liquid crystal displays were produced with the above-described construction and their characteristics mere measured. The results obtained are shown in Table 2.

TABLE 2

|  | Example 3 (No. 3) | Example 4 (No. 4) |
| --- | --- | --- |
| Composition (%): | | |
| 3-Ma-Ph3-CN | 4 | 4 |
| 5-Ma-Ph3-CN | 4 | 0 |
| Od1-Cy-Ph3-CN | 0 | 4 |
| Od3-Ph-Z-Ph-(Od3) | 15 | 15 |
| 1d1-Cy-Ph-CN | 10 | 10 |
| Od3-Cy-Ph-CN | 10 | 10 |
| Od3-Ph-T-Ph-(Od3) | 9 | 6 |
| 3-Ph-T-Ph-1 | 0 | 15 |
| Od1-Cy-Cy-5 | 12 | 0 |
| Od1-Cy-Cy-Phl-F | 12 | 12 |
| 3-Cy-Ph-T-Ph-2 | 0 | 5 |
| 4-Cy-Ph-T-Ph-1 | 0 | 4 |
| 3-Cy-VO-Ph-T-Ph-1 | 4 | 0 |
| 3-Cy-VO-Ph-T-Ph-5 | 3 | 0 |
| Od1-Cy-Cy-Ph-1 | 7 | 2 |
| Od3-Cy-Cy-Ph-1 | 10 | 5 |

TABLE 2-continued

|  | Example 3 (No. 3) | Example 4 (No. 4) |
| --- | --- | --- |
| Characteristics: | | |
| $T_{N-I}$ (° C.) | 91.9 | 90.4 |
| $T \rightarrow_N$ (° C.) | −44 | −22 |
| $V_{th}$ (V) | 1.93 | 1.90 |
| γ | 1.050 | 1.062 |
| $\Delta n$ | 0.165 | 0.207 |
| $dV/dT^{-20-50 ° C.}$ (mV/° C.) | 3.0 | 2.8 |
| $\tau^{25° C.}$ (msec) | 161 | 104 |
| $\tau^{-20 ° C.}$ (msec) | 1633 | 1007 |

The liquid crystal displays constituted with liquid crystal composition No. 3 comprising 4% of 3-Ma-Ph3-CN, 4% of 5-Ma-Ph3-CN and 15% of Od3-Ph-Z-Ph-(Od3) and constituted with liquid crystal composition No. 4 comprising 4% of 3-Ma-Ph3-CN, 4% of Od1-Cy-Ph3-CN and 15% of Od3-Ph-Z-(Od3) exhibited a switching time as short as 161 msec and 104 msec, respectively, at 25° C. The steepness γ at that temperature was 1.055 and 1.062, respectively, showing a sufficiently high contrast. The temperature dependence of threshold voltage dV/dT was as small as 3.0 mV/° C. and 2.8 mV/° C., respectively, in a temperature ranging from −20° C. to 25° C. The measurement was made at 1/80 duty.

It can be understood from these results that the liquid crystal display according to the present invention alleviates disadvantages of the state-of-the-art liquid crystal compositions, having a reduced temperature dependence of driving voltage, a high contrast, and a short switching time.

The liquid crystal display according to the present invention comprises a liquid crystal composition obtained by combining a specific liquid crystal compound and alleviates disadvantages of the state-of-the-art liquid crystal compositions, hating a reduced temperature dependence of driving voltage, a high contrast (steepness), and a short switching time. More specifically, the invention provides a liquid crystal composition which has improved temperature dependence of the threshold voltage, secures a high contract stably in a broader temperature range, and has a reduced switching time at room temperature and low temperature without impairing various characteristics of liquid crystals when driven at a desired threshold voltage or at a desired duty (time-sharing drive system) Thus, the present invention provides an STN-LCD having high display characteristics, such as an increased display capacity and capability of displaying colored motion pictures, which are requested of cellular phones of next generation and the like.

While the present invention has been described in detail and with reference to specific examples thereof, it will be apparent to one skilled in the art that various changes and modifications can be made therein without departing from the spirit and scope thereof.

What is claimed is:

1. A supertwisted nematic liquid crystal display having a twist angle of 180 to 270° C. and comprising:

a pair of substrates each having an orientation-controlling layer and a transparent electrode;

a liquid crystal layer comprising a liquid crystal composition, which is sandwiched by said substrates; and at least one polarizing sheet provided on at least one of said substrates, wherein said liquid crystal composition comprises:

at least one compound represented by formula (I):

(I)

wherein R¹ represents an alkyl group having 1 to 16 carbon atoms, an alkoxy group having 1 to 16 carbon atoms, an alkenyl group having 2 to 16 carbon atoms, an alkoxyalkyl group having 2 to 16 carbon atoms, or an alkenyloxy group having 3 to 16 carbon atoms; and at least one compound represented by formula (II):

(II)

wherein $R^2$ and $R^3$ each independently represent a fluorine-substituted or unsubstituted alkyl group having 1 to 16 carbon atoms, a fluorine-substituted or unsubstituted alkoxy group having 1 to 16 carbon atoms, or a fluorine-substituted or unsubstituted alkenyl group having 2 to 16 carbon atoms, and wherein said liquid crystal composition has a nematic-isotropic phase transition temperature of 75 to 150° C. and a refractive index anisotropy (Δn) of 0.07 to 0.25.

2. The supertwisted nematic liquid crystal display according to claim 1, which satisfies the condition:

$dV/dT \leq 7$ mV/° C.   (i)

wherein dV/dT shows temperature dependence of a threshold voltage and is represented as follows:

$dV/dT = |(V_{th}(50° C.) - V_{th}(-20° C.)/(50° C. - (-20° C.))|$ wherein $V_{th}$ is a threshold voltage at a driving temperature.

3. The supertwisted nematic liquid crystal display according to claim 1 or 2, wherein said at least one compound of formula (I) is present in an amount of 2 to 20% by weight and said at least one compound of formula (II) is present in an amount of 5 to 30% by weight, each based on the liquid crystal composition.

4. The supertwisted nematic liquid crystal display according to claim 1 or 2, wherein said liquid crystal composition further comprises at least one compound represented by formula (III):

(III)

wherein $R^4$ and $R^5$ each independently represent a fluorine-substituted or unsubstituted alkyl group having 1 to 16 carbon atoms, a fluorine-substituted or unsubstituted alkoxy group having 1 to 16 carbon atoms, a fluorine-substituted or unsubstituted alkenyl group having 2 to 16 carbon atoms, a fluorine-substituted or unsubstituted alkoxyalkyl group having 2 to 16 carbon atoms, or a fluorine-substituted or unsubstituted alkenyloxy group having 3 to 16 carbon atoms; ring A, ring B and ring C each independently represent a 1,4-phenylene group, a 2- or 3-fluoro-1,4-phenylene group, a 2,3-difluoro-1,4-phenylene group, a 3,5-difluoro-1,4-phenylene group, 2,6-difluoro-1,4-phenylene group, a 2-methyl-1,4-phenylene group, a 3-methyl-1,4-phenylene group, a naphthalene-2,6-diyl group, a phenanthrene-2,7-diyl group, a fluorene-2,7-diyl group, a trans-1,4-cyclohexylene group, a 1,2,3,4-tetrahydronaphthalene-2,6-diyl group, a decahydronaphthalene-2,6-diyl group, a trans-1,3-dioxane-2,5-diyl group, a pyridine-2,5-diyl group, a pyrimidine-2,5-diyl group, a pyrazine2,5-diyl group or a pyridazine-2,5-diyl group, and may be mono- or di-substituted with a group(s) selected from the group consisting of a fluorine atom, a chlorine atom and a methyl group; l represents 0, 1 or 2; and $Z^1$ and $Z^2$ each independently represent a single bond, —CH₂CH₂—, —(CH₂)₄—, —OCH₂—, —CH₂O—, —COO—, —OCO—, —CH=CH— or —C≡C—.

5. The supertwisted nematic liquid crystal display according to any one of claims 1 and 2, wherein said liquid crystal composition further comprises at least one compound represented by formula (IV):

(IV)

wherein $R^6$ represents a fluorine-substituted or unsubstituted alkyl group having 1 to 16 carbon atoms, a fluorine-substituted or unsubstituted alkoxy group having 1 to 16 carbon atoms, a fluorine-substituted or unsubstituted alkenyl group having 2 to 16 atoms, a fluorine-substituted or unsubstituted alkoxyalkyl group having 2 to 16 carbon atoms, or a fluorine-substituted or unsubstituted alkenyloxy group having 3 to 6 carbon atoms; m represents 0 or 1; $x^1$ represents a fluorine atom, a chlorine atom, a trifluoromethyl group, a trifluoromethoxy group or a cyano group; and $Y^1$ and $Y^2$ each represent a hydrogen atom or a fluorine atom.

6. The supertwisted nematic liquid crystal display according to claim 4, wherein said liquid crystal composition further comprises at least one compound represented by formula (IV):

(IV)

wherein $R^6$ represents a fluorine-substituted or unsubstituted alkyl group having 1 to 16 carbon atoms, a fluorine-substituted or unsubstituted alkoxy group having 1 to 16 carbon atoms, a fluorine-substituted or unsubstituted alkenyl group having 2 to 16 atoms, a fluorine-substituted or unsubstituted alkoxyalkyl group having 2 to 16 carbon atoms, or a fluorine-substituted or unsubstituted alkenyloxy group having 3 to 6 carbon atoms; m represents 0 or 1; $x^1$ represents a fluorine atom, a chlorine atom, a trifluoromethyl group, a trifluoromethoxy group or a cyano group; and $Y^1$ and $Y^2$ each represent a hydrogen atom or a fluorine atom.

7. The supertwisted nematic liquid crystal display according to claim 6, wherein said liquid crystal composition comprises 2 to 20% by weight of said at least one compound of formula (I), 5 to 30% by weight of said at least one compound of formula (II), 5 to 85% by weight of said at least one compound of formula (III), and 5 to 60% by weight of said at least one compound of formula (IV).

8. The supertwisted nematic liquid crystal display according to claim 7, which satisfies the condition:

$$dV/dT \leq 7\ mV/°C. \qquad (i)$$

wherein dV/dT shows temperature dependence of a threshold voltage and is represented as follows:

$$dV/dT = |(V_{th}(50°\ C.) - V_{th}(-20°\ C.))/(50°\ C. - (-20°\ C.))|$$

wherein $V_{th}$ is a threshold voltage at a driving temperature.

9. The supertwisted nematic liquid crystal display according to claim 2, which satisfies the condition:

$$\tau^{25°\ C.} \leq 200\ msec$$

wherein $\tau^{25°\ C.}$ is a switching time at 25° C.

10. The supertwisted nematic liquid crystal display according to claim 8, which satisfies the condition:

$$\tau^{25°\ C.} \leq 200\ msec$$

wherein $\tau^{25°\ C.}$ is a switching time at 25° C.

* * * * *